US 6,615,144 B2
United States Patent
Williams et al.
Date of Patent: *Sep. 2, 2003

(54) TIRE UNIFORMITY PREDICTION USING CURVE FITTING

(75) Inventors: Stephen Loren Williams, Wadsworth, OH (US); Shaun Matthew Immel, Massillon, OH (US); Gino Salvador Vicini, Mogadore, OH (US); George Jeffrey Lipczynski, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 142 days.

This patent is subject to a terminal disclaimer.

(21) Appl. No.: 09/850,358

(22) Filed: May 7, 2001

(65) Prior Publication Data

US 2002/0177959 A1 Nov. 28, 2002

(51) Int. Cl.⁷ .................. G01M 17/02; G06F 15/00
(52) U.S. Cl. .................. 702/41; 702/142; 702/144; 702/146; 73/146
(58) Field of Search .................. 702/41, 66, 67, 702/70, 71, 75, 76, 194, 142; 73/146, 7, 8, 11, 660

(56) References Cited

U.S. PATENT DOCUMENTS 5,396,438 A * 3/1995 Oblizajek .................. 702/84
6,065,331 A 5/2000 Fukasawa

* cited by examiner

Primary Examiner—Kamini Shah
(74) Attorney, Agent, or Firm—Howard M. Cohn (57) ABSTRACT

Methods and apparatus for predicting tire uniformity, preferably a harmonic component of force variation (radial, lateral, or tangential) for a production tire operating at a high speed, and also method and apparatus for manufacturing tires and controlling the manufacturing of tires in response to quality control based on a comparison of a production tire's predicted uniformity versus predetermined criteria. A production tire's predicted tire uniformity is determined by a calculation using a prediction curve with parameters which are determined for the production tire by collecting measurement data for the production tire using a factory floor tire uniformity machine operated at a plurality of intermediate test speeds, and then fitting the prediction curve to the measurement data, preferably using a least squares curve fitting process. Higher speed measurements are optionally given greater weight in the curve fitting process as compared to lower speed measurements. The prediction curve is preferably a parabolic curve type. The plurality of intermediate test speeds (preferably at least 3) are between and including a lower test speed (preferably at least 60 rpm) and a highest reasonable test speed. Most preferably, the lower test speed is at least approximately 200 rpm, and the highest reasonable test speed is at least approximately 200 rpm higher than the lower test speed. Preferably, the individual values of the plurality of intermediate test speeds are spaced at approximately regular intervals between and including the lower test speed and the highest reasonable test speed.

20 Claims, 6 Drawing Sheets

TIRE UNIFORMITY PREDICTION USING CURVE FITTING

CROSS-REFERENCE TO RELATED APPLICATIONS

This application relates to a related co-pending U.S. patent application Ser. No. 09/817,983 having a filing date of Mar. 27, 2001, and a common assignee with the present application.

TECHNICAL FIELD OF THE INVENTION

The present invention relates to methods of measuring pneumatic tire uniformity and, more particularly, to methods of predicting high-speed tire uniformity.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of sufficient amplitude will cause force variations on a surface, such as a road, against which the tires roll producing vibration and noise. When such force variations exceed an acceptable maximum level, the ride and handling of a vehicle utilizing such tires will be adversely affected. It is known that the magnitudes of the force variations change with the speed of tire rotation, generally (but not always) increasing in magnitude with speed, therefore a vehicle operator's perception of tire quality (and vehicle ride) will be most influenced by the force variations occurring at high speeds such as "highway speeds" of, for example, 100 kilometers per hour (kph) and higher. Accordingly, purchasers of tires, especially large volume purchasers such as vehicle manufacturers ("OEMs"), would prefer to know and specify maximums for high speed force variations on purchased tires. Unfortunately, direct measurement of high speed force variations on all tires is difficult and expensive, therefore the industry has devised a variety of equipment and methods for predicting high speed tire performance (uniformity, force variations) based on statistical sampling and on simpler measurements primarily including "low speed" tire uniformity measurements, and possibly also measurements of tire balance.

During the typical tire manufacturing process, factory floor measurements of tire uniformity are performed on tire uniformity machines ("TUMs"), which are used to monitor the quality of the tire production process and may guide or incorporate corrective measures such as grinding to improve the balance and uniformity of a tire. A factory floor TUM is a low speed unit, typically operated at 60 revolutions per minute (rpm), which corresponds to less than 10 kph for a typical passenger car tire. In general, a tire uniformity machine subjects a tire to normal conditions of mounting, inflation, load, and rotation (at low speed) while collecting measurement data on variations of force, and sometimes also deflection (e.g., "runout"), and instantaneous angular velocity. A tire uniformity machine typically includes an assembly for rotating a test tire against the surface of a freely rotating load wheel. In such an arrangement, the load wheel is acted upon in a manner dependent on the forces exerted by the rotating tire, which are measured by appropriately placed measuring devices connected to the supporting structure of the loading wheel. When a tire being tested yields unacceptable results, shoulder and center rib grinders are used to remove a small amount of the tire tread at precisely the location of non-uniformities detected by the measuring devices. As the tire is rotated, it is measured and ground simultaneously. In a sophisticated, low speed production tire uniformity machine, such as a Model No. D70LTX available from the Akron Standard Co. of Akron Ohio, the force measurements are interpreted by a computer and rubber is removed from the tire tread using grinders controlled by the computer.

Once a tire undergoes correction for force variations in a TUM, it is common manufacturing practice to remove the tire from the TUM and place the tire in a balance machine to measure the amount of imbalance of the tire. Typically, the tires are mounted in the balance machine in a manner similar to that of the tire uniformity machine and inflated to a preset pressure. Then, the static (single-plane) and couple (two-plane) imbalances are measured by one of a variety of well-known methods. When a tire is found to be imbalanced to an unacceptable level, the tire is ordinarily scrapped.

The assumption generally made in the art is that the factory floor measurements of tire quality are reasonably related to high speed tire performance, so that placing "suitable" limits on tire imbalance and on low speed force variations will produce tires that have acceptable high speed performance. A common technique for establishing the suitable limits is to measure individual tires at both high speed and low speed and then mathematically relate the two measurements. In this technique's simplest conceptual form, a tire is found that exhibits the maximum allowable high speed force variation, and then the magnitude of the low speed force variation measured for the same tire is used as the suitable limit. It is known that the relationship between high speed force variation and low speed force variation can be different for different tire constructions (designs) and for different low and high speed tire uniformity machines, so this technique must be repeated for each variation of tire and machine. In many cases, it is desired to be able to predict the magnitude of high speed force variations from factory floor measurements, and so inventive effort, detailed hereinbelow, has been applied to the determination of mathematical equations (including "transfer functions") to relate various combinations of factory floor measurements to predicted high speed force variations.

Before discussing transfer functions and prediction methods, it is important to understand the various measurements that are involved. Tire performance, in terms of vibration (and noise caused by tire vibration) at any given tire rotational speed, is substantially determined by tire uniformity and is directly indicated by the magnitude of force variations, which occur as the tire rolls under load on a surface. If the surface is a tire uniformity machine load wheel that is instrumented to measure forces, then the forces can be measured to report a direct measurement of the tire's vibration performance (i.e., uniformity) for the tire speed at which it is measured. Since high speed tire uniformity measurements are impractical for large volume factory floor use, low speed TUM measurements must be utilized to predict high speed measurements. The problem is that with low speed TUMs, certain force variations are either too small to be accurately measured at low speeds, or else a measurement of a particular low speed force variation is not sufficient to predict the high speed variation of that force. For these certain force variations, low speed force measurements must be supplemented or replaced with other measurements including, for example, measurements of: other types of force variation, tire imbalance, tire surface displacement (runout), tire stiffness variation, tire angular velocity variation and load wheel velocity variation.

In the art, forces of a tire that is rolling under load on a load bearing surface are commonly broken down into three orthogonal components which will be primarily referred to herein as: radial, lateral, and tangential. Radial forces act in the tire's radial direction, i.e., perpendicular to the tire's axis of rotation. Radial forces are strongest in the vertical direction (e.g., tire "hop") as the tire interacts with the load bearing surface, but may also have a horizontal (fore-aft, or "surge") component due to, for example, the radial centrifugal force of a net mass imbalance in the rotating tire. Lateral forces act in a direction parallel to the tire's axis of rotation, and generally occur where the tire's surface touches the load bearing surface. Lateral force causes either tire wobble or a constant steering force. Tangential force, or fore-aft force is experienced at the surface of contact between tire and load bearing surface in a direction both tangential to the tire's outer circumference (e.g., tread surface) and perpendicular to the tire's axis of rotation (thus also perpendicular to the radial and lateral forces). Tangential force variations are experienced as a "push-pull" effect on a tire, which can be analogized to the sensation of a wheel barrow traveling over a bump in the road, i.e. increased force as the wheel barrow is pushed up the bump and decreased force as the wheel barrow travels down the bump. Investigations have shown that there are multiple mechanisms active in causing tangential force variation.

Of the three types of force (radial, tangential and lateral), tangential force variation (TFV) is the most speed dependent, and is practically immeasurable on a typical production low speed tire uniformity machine, which operates at a speed such as 60 rpm. Instead, tangential force variation can only be effectively measured at highway speeds using a high speed, laboratory tire uniformity machine, such as a Model HSU-1064, available from the Akron Standard Co. of Akron Ohio.

Variations of the three types of force are known to be caused by non-uniformities (asymmetries, imperfections) in the tire (and/or in the wheel and axle hub upon which the tire is mounted). Other sources of force, such as friction drag, are also known but are not a concern in this discussion of tire uniformity. Non-uniformities in the tires can be generally classified as asymmetries in mass, dimensional quantities and stiffness. A tire that is asymmetric from axial side to axial side may produce lateral forces, and asymmetry between angular points around the tire's rotational axis will cause variations in force as the tire rotates. An imperfection that occurs only once around the tire, for example a single bump on the tire tread, may cause a strong force variation with a period which matches the period of the tire's revolution, i.e., once per revolution when the bump hits the load bearing surface. Superimposed on the measurement of this strong force variation may be another force measured as the centrifugal force of the bump with a magnitude that will vary sinusoidally and have the same period as the tire revolution. A second bump on the tire tread would produce a second peak in a curve plotting the force measurements versus time. Obviously the force measurement curve can rapidly become quite complex. Through the well-known mathematical process of Fourier Transform calculation, even very complex periodic force variation measurement curves can be mathematically represented as a sum of components wherein each component is a sine curve characterized by its own amplitude and phase. The component of the Fourier equation, which has the same period as the tire revolution, i.e., has a frequency of one cycle per revolution of the tire, is referred to as the "first harmonic". For example, if the tire is rotating at 60 revolutions per minute, then the first harmonic is a sine curve with a frequency of 60 cycles per minute (1 cycle per second, or 1 Hertz). The component of the Fourier equation that has half the period of the tire revolution (twice the revolution frequency) is the "second harmonic", and so on.

Since there are three orthogonal forces being considered, there are three separate force variation measurement curves: radial force variation (RFV), lateral force variation (LFV), and tangential force variation (TFV). Fourier transformations of each of the three force variation measurement curves will produce families of harmonic components (some of which may have a zero magnitude) for each of the three curves. The first harmonic of radial force variation can be abbreviated as "R1H" for Radial $1^{st}$ Harmonic; the first harmonic of lateral force variation can be abbreviated as "T1H" for Lateral $1^{st}$ Harmonic; and the first harmonic of tangential force variation can be abbreviated as "T1H" for Tangential $1^{st}$ Harmonic. Similarly, second harmonic components can be abbreviated as R2H, L2H, and T2H, for radial, lateral and tangential $2^{nd}$ harmonics, respectively; and so on for third and higher harmonics of the three force variations.

As alluded to hereinabove, tire imbalance (mass asymmetry) is a contributing factor in certain tire force variation measurements. Tire imbalance can produce significant force variations, but fortunately is easily measured, even at relatively low tire revolution speeds (e.g., about 300 rpm), although tire balance measuring machines suitable for factory floor use are available which can be used with much higher rpm speeds than the factory floor TUMs.

Two separate physical phenomena can be used to model the imbalance of a tire, static imbalance and couple imbalance. Static imbalance is the net result of centrifugal forces created by non-uniformities in the distribution of tire mass (mass asymmetry) around the circumference of the tire. As an element of tire mass rotates about an axis, centrifugal force is experienced by the element, which tends to pull it away from the center of rotation (axis), the magnitude of this centrifugal force being:

$$F = m \times \omega^2 \times r$$

wherein m=mass of the element, ω=rotational velocity, and r=radius of the element's location relative to the axis of rotation. If the mass of the tire is distributed equally about the center of rotation, the centrifugal force on each of the elements of tire mass would be negated by an equal and opposite force acting upon an element of tire mass located on the opposite side of the center of rotation, and thus no net centrifugal force would act upon the tire during rotation. However, when the distribution of tire mass is nonuniform, so that there are elements of differing mass opposing each other, or opposing elements of equal mass which are located at differing radial distances from the center of rotation, the centrifugal force on these elements is not canceled by the opposing force acting on the opposing element of tire mass located on the opposite side of the center of rotation. In such cases, the tire experiences a net force acting through the element of either greater tire mass or of equal mass located at a greater distance from the center of rotation. These net forces cause a static imbalance about the center of rotation of the tire. Static imbalance is also known as single plane imbalance, since the term is restricted to mass asymmetries that occur within a single circumferential plane of the tire (a plane perpendicular to the tire's axis of rotation).

Couple imbalance is caused by the above described mass distribution non-uniformities, or mass imbalances/asymmetries, which occur in multiple circumferential planes, thereby creating net moments about an axis in a plane which is through the axial centerline of the tread and perpendicular to the axis of rotation of the tire. The magnitude of the moment equals the net force acting on the mass non-uniformity, or the imbalance force, multiplied by the axial distance of the mass non-uniformity from the centerline of the tread (and thus the axis located in the plane through the tread centerline). This moment M can be expressed as:

$$M = F \times d = (m \times \omega^2 \times r) \times d$$

wherein variables m, $\omega$, and r are the properties described above and d=axial distance between the mass non-uniformity and the centerline of the tread. The effect of such moments is that the tire tends to wobble, as the effective axis of rotation nutates. Couple imbalance is also referred to as "two plane imbalance" because the sum of all the couple imbalances in a tire can be resolved into a single net moment determined by two mass elements with a first element of mass $m_1$ located at a certain angle and radius $(\phi_1, r_1)$ in a first circumferential plane located at a distance $d_1$ from the centerline of the tread, and a second element of mass $m_2$ located at a certain angle and radius $\phi_2, r_2$ in a second circumferential plane located at a distance $d_2$ from the centerline of the tread, such that $d_1=d_2$, $m_1=m_2$ and $|\phi_1-\phi_2|=180°$.

The combined effect of the static imbalance and the couple imbalance is referred to as the dynamic imbalance of a tire, which is the total imbalance experienced by a rotating tire. As static imbalance and couple imbalance are two distinct and mutually independent physical phenomena, the dynamic behavior of a rotating tire can be analyzed by overlaying the effect of static imbalance on the effect of couple imbalance. Virtually all tires have some differences in the distribution of the tire mass that causes dynamic imbalance to be present, but the imbalance will be negligible, or at least acceptable, in a "uniform" tire. Of course, as detailed hereinabove, measurement of uniformity and therefore acceptability of a tire is a rotational speed dependent phenomenon because the forces produced by non-uniformities are speed dependent.

U.S. Pat. No. 5,396,438(Oblizajek, assigned to General Motors Corporation, hereinafter referred to as the "GM Patent"), incorporated in its entirety by reference herein, discloses a method of manufacturing tires which preferably includes measurement of two or more low speed tire parameters, determination of transfer functions which are used to calculate predicted highway speed (high speed) force variations, and then comparison of high speed values predicted for production tires to predetermined criteria for controlling manufacture of the production tires responsive to the comparison. The determination of transfer functions comprises testing a sample set of tires at both low speed and high speed on tire uniformity machines. The GM Patent's primary embodiment is for prediction of high speed, fore-aft (tangential) force variations (TFV), but it is stated that the method can be advantageously applied to prediction of high speed LFV and RFV in the same manner. It is further stated that any harmonic ("order of tire rotation") of the high speed force variations can be predicted according to the disclosed method. The low speed measurements are made of two or more tire parameters selected from a list which includes: "variations in effective rolling radius, radial force variation, geometric runout variation, tread gauge variation of finished tire, variations in angles of internal tire reinforcing materials, that is, steel belts and fabric or steel body plies of the finished tire, variations in geometry, that is, widths and locations of edges and centerline of internal tire reinforcing materials such as steel belts and fabric or steel body plies of the finished tire, tread gauge variation of the tire at intermediate stages of manufacture, variations in angles of internal tire reinforcing materials, that is steel belts and fabric or steel body plies of the tire at intermediate stages of manufacture, variations in geometry, that is widths and locations of edges and the centerline of internal tire reinforcing materials such as steel belts and fabric or steel body plies at intermediate stages of manufacture and tire fore and aft force variation." (col. 15, line 63 et. seq.) In the claims, this list is generally narrowed to include "selecting first and second measurable parameters from a set comprising: variation in effective rolling radius; radial force variation; geometric runout variation; and fore and aft force variation." The primary embodiment of the GM invention discloses an equation (6) in column 10 for a calculated prediction of the fore and aft force component Fxnm measured at the selected highway speed of tire 'm' at order (harmonic) 'n'. The equation (6) is a sum of low speed measurements 'F' multiplied by complex quantity transfer functions 'H' for a tire 'm' at order (harmonic) 'n'. Equation (6) uses the n,m components of three low speed measurements: Fznm is the radial force; Frnm is the effective rolling radius; and Funm is the geometric runout. An assumption that makes this equation usable is stated in col. 11, line 66 et. seq.: "If the quantities Hzn, Hrn, Hun, . . . are known, then Equation (6) can be used to predict Fxn. This has generally not been the case because the particular details and manner by which parameters such as tire mass, stiffness, and damping matrices or the equivalents, combine to effect the polynomials $P_q(s)$ are unknown. However, as recognized by this invention, for quantities of tires manufactured by an individual tire manufacturer to a given engineering specification, i.e., where all tires are intended to be identical, these parameters will be relatively invariant among these ostensibly identical tires. Variations between tires, furthermore, will only occur in the measurements of non-uniformity, i.e., Fzn, Frn, Fun, . . . . "

U.S. Pat. No. 6,065,331 (Fukasawa, assigned to Bridgestone Corporation, hereinafter referred to as the "Bridgestone Patent"), incorporated in its entirety by reference herein, discloses method and apparatus for predicting a higher-order component $2^{nd}$ and higher harmonics) of high speed uniformity of a tire, and method of manufacturing tires utilizing the method and apparatus. The method preferably comprises measuring, for a single tire within a tire lot, a low-speed dynamic stiffness at a frequency corresponding to an order of a higher-order component to be predicted when said tire rolls at a low speed, and a high-speed dynamic stiffness at a frequency corresponding to said order when said tire rolls at a high speed, and then using the dynamic stiffness measurements in an equation to predict high speed RFV or TFV from low speed measurements of RFV and radial runout (effective rolling radius). The preferred method of determining low speed radial runout is to calculate it from low speed TFV measurements, according to a linear relationship with slope and intercept constants determined by a linear regression calculation performed on measurements of 20 tires within the tire lot. The tire vertical dynamic stiffness is obtained from vertical displacement of a tire axis, namely, vertical displacement X of a drum surface, and vertical axial force Fz of a tire, which are measured by using a protrusion run-over type testing machine including a drum having a cleat mounted on the surface of the drum. The highest tire speed measured on such a drum is reported as 85 kph.

It is an object of the present invention to overcome perceived limitations in the methods of the GM Patent and of the Bridgestone Patent in order to improve and/or simplify the prediction of high speed tire uniformity for production tires using predictive calculations incorporating realistically achievable factory floor measurements of the production tires. Calculated prediction of all relevant harmonics of radial, lateral and tangential force variation for tire speeds in a wide range of high speeds is desired.

BRIEF SUMMARY OF THE INVENTION

According to the invention, a method for predicting a harmonic component of force variation for a production tire comprises the steps of: collecting a set of measurement data for the production tire, the measurement data comprising measurements of the harmonic component of force variation at a plurality of intermediate test speeds on a factory floor tire uniformity machine; determining parameter values for a prediction equation by performing a curve fit of a predetermined curve type to the set of measurement data; and predicting a harmonic component of force variation for the production tire rotating at a prediction speed by applying the prediction speed to the prediction equation.

According to an aspect of the invention, the method is characterized by the step of predetermining an optimum quantity and individual values of the plurality of intermediate test speeds. Optionally, the steps of predetermining the curve type and the optimum quantity and individual values of the plurality of intermediate test speeds are accomplished by experimentation. Optionally, the steps of predetermining the curve type and the optimum quantity and individual values of the plurality of intermediate test speeds are performed for each tire construction, for each harmonic component to be predicted, and for each prediction speed. Preferably, the curve type is predetermined to be a parabolic curve type, and the quantity of the plurality of intermediate test speeds is predetermined to be at least three. Optionally, the method is further characterized by the steps of: predetermining a highest reasonable test speed and a lower test speed, which is less than the highest reasonable test speed; and spacing the individual values of the plurality of intermediate test speeds at approximately regular intervals between and including the lower test speed and the highest reasonable test speed. Preferably, the lower test speed is predetermined to be greater than 60 rpm, and most preferably to be at least 200 rpm. Optionally, the lower test speed is predetermined to be greater than 60 rpm, and at least 200 rpm below the highest reasonable test speed. Preferably, the lower test speed is predetermined to be approximately 300 rpm; and the highest reasonable test speed is predetermined to be approximately 750 rpm.

According to an aspect of the invention, the method is characterized by the step of performing the curve fit by means of a least squares curve fitting process. Optionally, the step of performing the curve fit comprises weighting higher speed measurement data points more than lower speed measurement data points.

According to the invention, a method of manufacturing tires comprises the steps of: collecting a set of measurement data for a production tire, the measurement data comprising measurements of a harmonic component of force variation at a plurality of intermediate test speeds on a factory floor tire uniformity machine; determining parameter values for a prediction equation by performing a curve fit of a predetermined curve type to the set of measurement data; predicting a harmonic component of force variation for the production tire rotating at a prediction speed by applying the prediction speed to the prediction equation; comparing the predicted harmonic component of force variation for the production tire to predetermined criteria; and controlling the manufacturing of production tires in response to results of the step of comparing.

According to an aspect of the invention, the method of manufacturing is characterized by the step of predetermining an optimum quantity and individual values of the plurality of intermediate test speeds. Optionally, the steps of predetermining the curve type and the optimum quantity and individual values of the plurality of intermediate test speeds are performed for each tire construction, for each harmonic component to be predicted, and for each prediction speed. Preferably, the curve type is predetermined to be a parabolic curve type, and the quantity of the plurality of intermediate test speeds is predetermined to be at least three. Optionally, the method of manufacturing is further characterized by the steps of: predetermining a highest reasonable test speed and a lower test speed which is less than the highest reasonable test speed; and spacing the individual values of the plurality of intermediate test speeds at approximately regular intervals between and including the lower test speed and the highest reasonable test speed.

According to the invention, an apparatus for controlling tire manufacturing comprises: factory floor testing equipment comprising an intermediate speed production tire uniformity machine for measuring production tires after a tire assembly process; a computer for collecting measurement data from the factory floor testing equipment, for curve fitting to determine prediction equation parameters, and for predicting a harmonic component of force variation; and a quality control means for accepting and rejecting production tires based on a harmonic component of force variation predicted for the production tires.

According to an aspect of the invention, the apparatus is characterized in that the quality control means provides feedback for correcting the tire assembly process.

According to another aspect of the invention, the apparatus is characterized in that the intermediate speed production tire uniformity machine is a low speed factory floor TUM, which has been modified for optimum performance when measuring each production tire at a plurality of intermediate speeds.

Other features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines, which would otherwise be visible in a true cross-sectional view, for illustrative clarity.

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299.

Similar elements throughout the drawings may be referred to by similar reference numerals. For example, the element 199 in a figure may be similar, and possibly identical to the element 299 in another figure. In some cases, similar (including identical) elements may be referred to with similar numbers in a single drawing. For example, each of a plurality of elements 199 may be referred to individually as 199$a$, 199$b$, 199$c$, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

DETAILED DESCRIPTION OF THE INVENTION

As detailed in the background section hereinabove, radial, lateral and tangential force variations are important measurements that indicate tire uniformity in general, and in particular indicate vibrational aspects of a tire's performance on a moving vehicle. Since tire force variations change with the tire's speed of rotation, it is important to know how a tire will perform at higher speeds such as highway speeds (e.g., 100 kph or more). Unfortunately, high speed tire uniformity measurements are not generally practical on the factory floor as part of normal tire manufacturing, so various methods of predicting high speed performance from low speed factory floor measurements have been developed. Since it is easier to measure force variation at low speeds, radial force variation (RFV) at the low speed of typically 60 rpm is commonly measured during tire production, and for many years has been used as a predictor for the high speed RFV based on an assumed linear relationship. Tangential force variation (TFV) is relatively small in magnitude at 60 rpm and therefore the most difficult to measure in production, so for many years TFV was only measured on limited samples of production tires using laboratory high speed TUMs. Prediction of high speed tire uniformity has therefore been limited in capability, and the accuracy of prediction has deteriorated as the industry definition of "high speed" has increased to even higher speeds.

The methodologies disclosed in the GM Patent and the Bridgestone Patent have been developed to predict high speed tire uniformity, especially various harmonics of the high speed TFV. The GM Patent's predictions are primarily based on low speed RFV and angular velocity variation data with the possible addition of geometric (runout) variation data, wherein all of this "low speed" data is measured at a single TUM speed, typically 60 rpm. The Bridgestone Patent's predictions are based on low speed force variation data, low speed radial runout data, and dynamic stiffness measurements. Although there are generally three sources of non-uniformity in a tire (geometrical, stiffness and mass asymmetries), the prior art methodologies including those of both the GM Patent and the Bridgestone Patent, generally do not directly account for the effect of mass asymmetries on tire uniformity measurements at different tire speeds. The three asymmetries interact at the tire's footprint and produce RFV, LFV and TFV at the footprint, which are transferred to the spindle of a TUM (or axle of a vehicle) through the tire structure. Both force creation and force transmission are speed dependent. For example, mass related forces are negligible or practically unmeasurable at 60 rpm, but play an increasingly higher role as the speed increases, making prediction based only on low speed force measurement data insufficient.

In a related co-pending patent application Ser. No. 09/817,983 filed Mar. 27, 2001, having a common assignee, and incorporated in its entirety by reference herein, the importance of mass asymmetries is recognized, and a method is disclosed to include realistically achievable factory floor measurements of production tire mass asymmetries in transfer functions used to predict high speed tire uniformity from factory floor measurements on a tire balance checker plus a low speed TUM.

Figure 3:
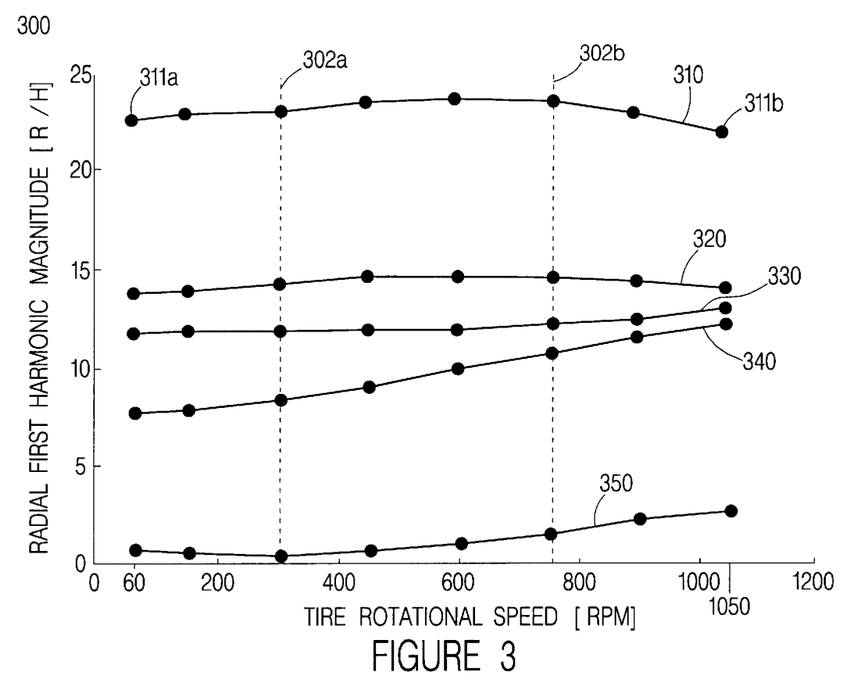
FIG. 3 is a graph of radial force variation first harmonic magnitude (R1H) versus tire rotational speed (rpm) for five tires measured at increasing speeds on a tire uniformity machine.
Figure 3A:
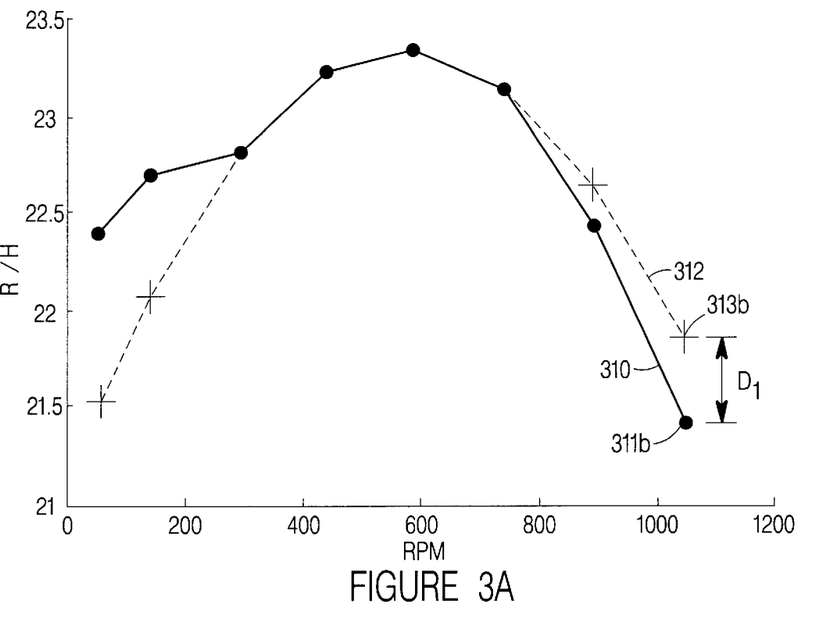
FIG. 3A is a graph of R1H versus rpm for tire #1 of the FIG. 3 tires, showing measurements in the solid line curve and showing with a dashed line curve a prediction curve for tire #1 determined according to the invention.
Figure 3B:
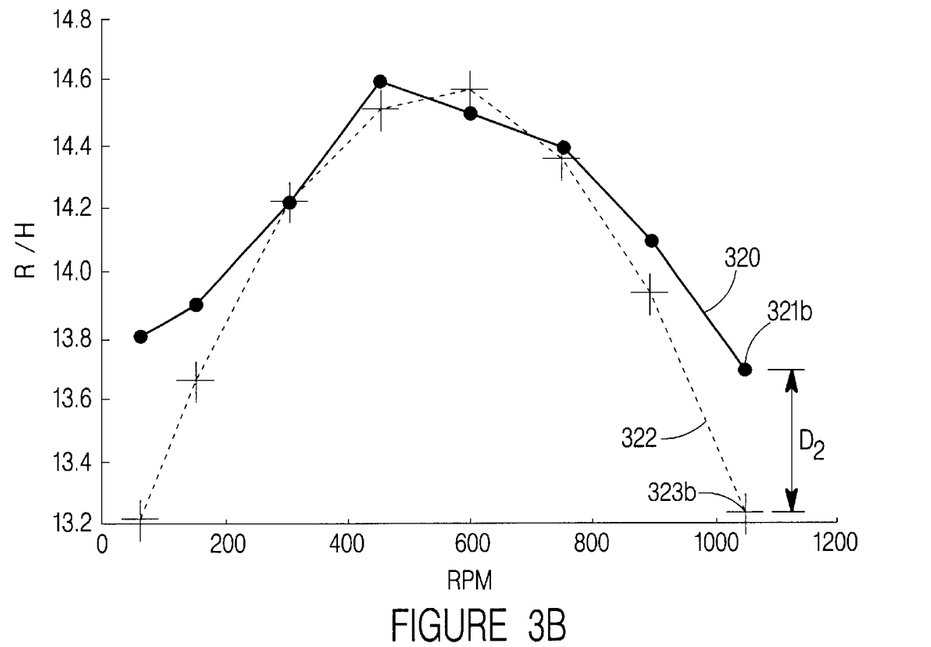
FIG. 3B is a graph of R1H versus rpm for tire #2 of the FIG. 3 tires, showing measurements in the solid line curve and showing with a dashed line curve a prediction curve for tire #2 determined according to the invention.
Figure 3C:
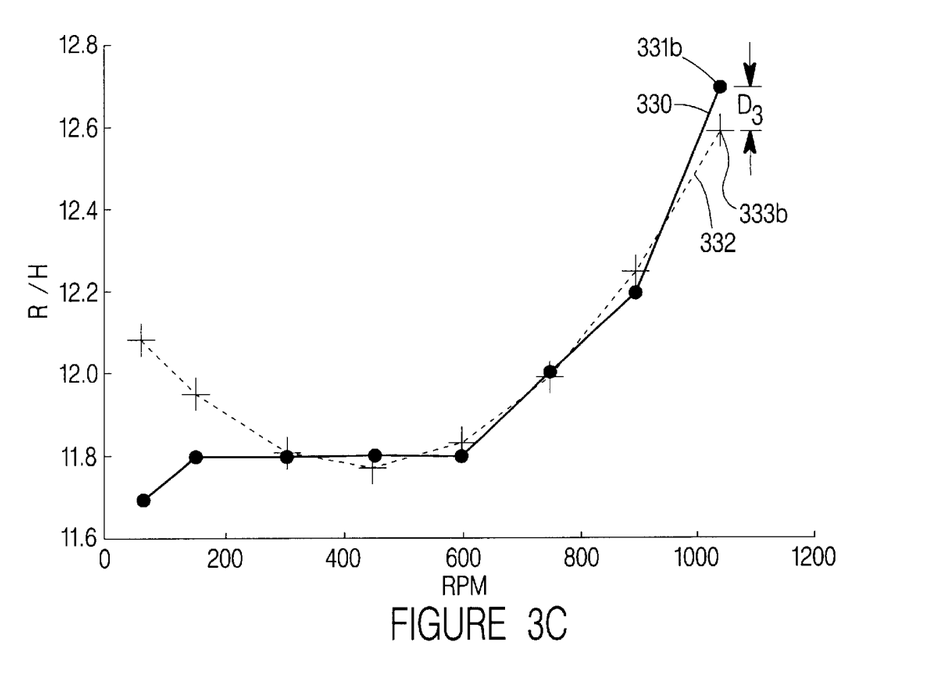
FIG. 3C is a graph of R1H versus rpm for tire #3 of the FIG. 3 tires, showing measurements in the solid line curve and showing with a dashed line curve a prediction curve for tire #3 determined according to the invention.
Figure 3D:
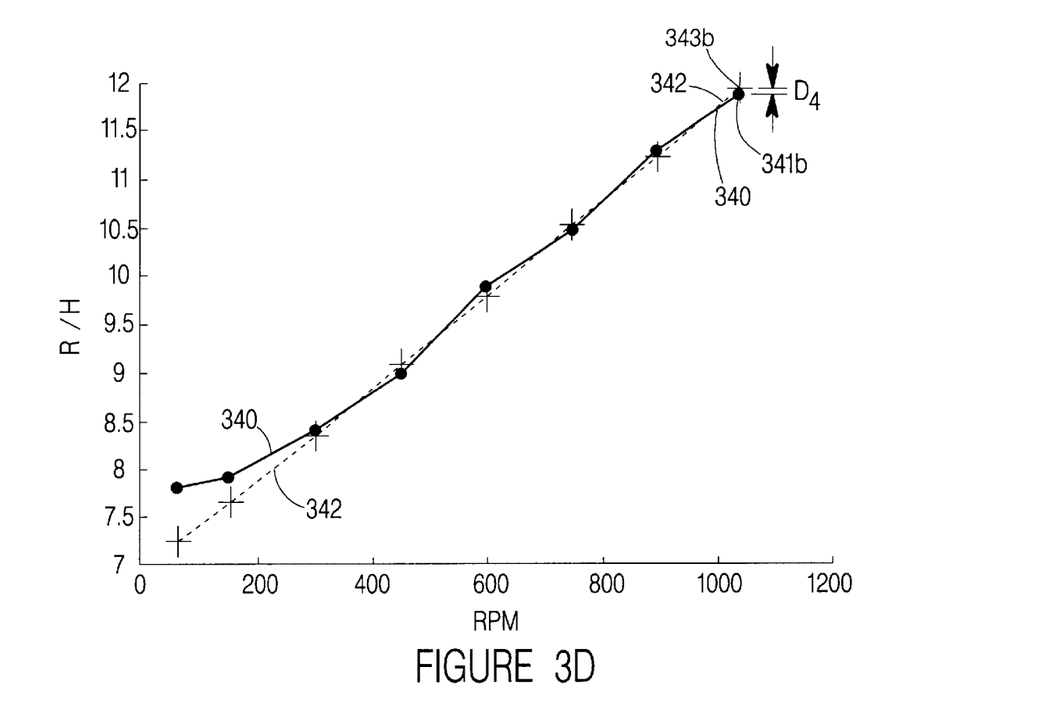
FIG. 3D is a graph of R1H versus rpm for tire #4 of the FIG. 3 tires, showing measurements in the solid line curve and showing with a dashed line curve a prediction curve for tire #4 determined according to the invention.
Figure 3E:
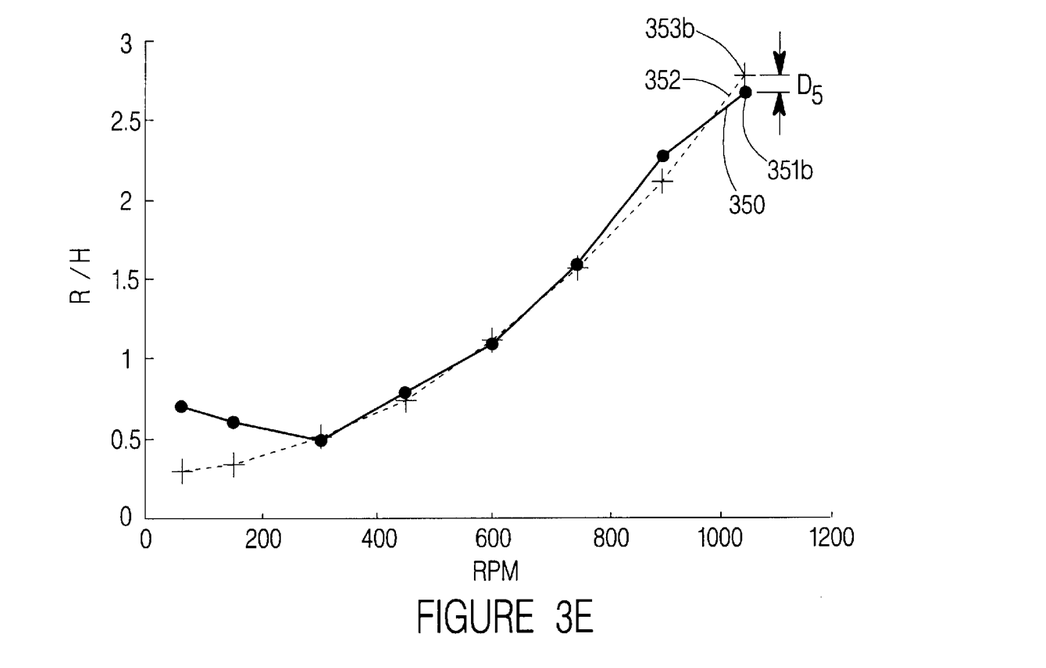
FIG. 3E is a graph of R1H versus rpm for tire #5 of the FIG. 3 tires, showing measurements in the solid line curve and showing with a dashed line curve a prediction curve for tire #5 determined according to the invention.

The present invention notes that the three types of tire asymmetries may interact with each other differently at different speeds, thereby causing any given tire uniformity measurement to change with tire rotational speed. Since the interaction of asymmetries may be different in different tires, even tires of the same construction (e.g., type, size, design, etc.), therefore the change in uniformity versus tire speed can be different for different tires, even increasing for one tire and decreasing for another. For example, R1H (radial force variation, first harmonic), may be due to an interaction between a static mass imbalance (mass asymmetry) and a hard spot in the tread (stiffness asymmetry). Depending on the relative magnitudes and locations of the mass and stiffness asymmetries in different tires, those tires will show different changes in R1H as speed increases. The graph 300 in FIG. 3 illustrates this effect for five tires which had R1H measured at increasing speeds on a tire uniformity machine. The graph 300 shows the measured magnitude of the R1H component plotted on the vertical axis versus tire speed in rpm plotted on the horizontal axis. The lowest speed measurement is 60 rpm (typical for a low speed, factory floor TUM), and the highest speed measurement was at 1050 rpm (typical for a "high speed" measurement on a laboratory, high speed TUM, and also typical of a high speed for which predicted values are desired, i.e., a "prediction speed"). Curve 310 is for tire 1, curve 320 is for tire 2, curve 330 is for tire 3, curve 340 is for tire 4, and curve 350 is for tire 5. Tires 1–5 are exemplary of a group of 47 tires, which were tested on the same laboratory TUM, wherein all 47 tires were of the same construction. The dots (e.g., 311a, 311b) on each curve 310–350 indicate plotted measurement points, and each curve 310–350 comprises a series of straight lines connecting a tire's dots in order. Referring, for example, to curve 310, the 60 rpm "low speed" measurement (dot 311a) has a larger magnitude for R1H than the 1050 rpm "prediction speed" measurement (dot 311b). Curve 320 arches up at intermediate speeds, but the prediction speed measurement is still somewhat lower than the low speed measurement. On the other hand, curves 330, 340, and 350 have varied curve shapes all producing prediction speed measurements which are higher than the corresponding low speed measurements, especially for curve 340.

The prior art prediction methods described hereinabove (linear or transfer function calculations) generally assume that the tires of a given construction will all behave similarly according to a prediction equation having fixed parameters, and then calculate a predicted value based on measurements taken at a single factory floor speed. The prior art prediction equation for each tire construction is generally predetermined from measurements made on a sample set of tires having that tire construction. In contrast, the present invention utilizes several intermediate speed measurements (between low speed and high speed) on each production tire in order to determine a prediction equation specific to the individual measured production tire, and then uses the specific prediction equation to calculate the predicted value for that individual production tire. For example, four intermediate speed measurements spaced between a lower speed 302a and a higher speed 302b could be utilized to determine a prediction equation.

The application of the inventive method to the prediction of high speed radial force variation (RFV) will be presented as an embodiment of the invention. The same general techniques can be applied to the prediction of tangential force variation (TFV) and of lateral force variation (LFV) in ways that should become apparent to one skilled in the relevant arts in light of the concepts and methods presented herein.

Figure 1:
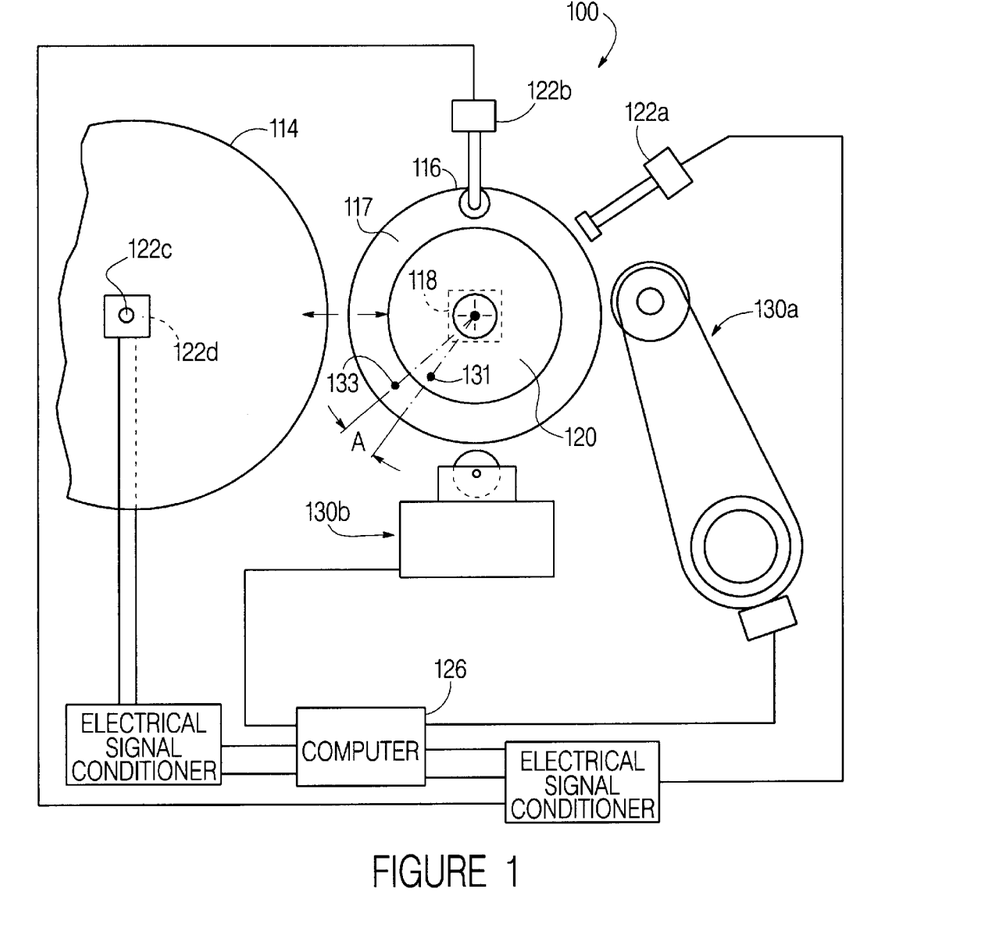
FIG. 1 is a representative view of a tire uniformity machine with a tire mounted thereon according to the present invention.

FIG. 1 shows a schematic of a tire uniformity machine (TUM) 100, illustrating an example of a typical tire uniformity machine such as would be suitable for the present invention. A load wheel 114 applies a load to a tire 116 mounted on a rim 120 that is rotated by a drive motor 118. One or more sensors 122 (122a, 122b, 122c, 122d) measure, as needed: lateral, tangential, and radial forces exerted by the tire 116. Lateral forces occur perpendicular to the plane in which the tire 116 rotates. Tangential forces act tangentially to the tire's circumference. Radial forces act parallel to a radius of the tire 116. Sensors 122 may also be provided to measure geometric characteristics such as radial and/or lateral position of portions of the tire 116 (e.g., tread, shoulder), to measure position of the axis of rotation of the tire, and to measure rotational angle of the rim and/or of the tire. A zero-degree reference mark readable by a sensor is generally provided on the rim (rim zero-degree reference mark 131). A tire zero-degree reference mark 133 readable by a sensor can be provided on the tire, for example by means of a reflective sticker applied to the tire sidewall. The angle between the rim zero-degree reference mark 131 and the tire zero-degree reference mark 133 is angle A. Measurements are made electronically by the tire uniformity machine 100 using the sensors 122, and then converted to force and geometric measurements as appropriate. Measurement signals are then preferably transferred to a computer 126 for analysis and possible storage. Optional grinders 130 (130a, 130b) can be incorporated in the tire uniformity machine 100 in order to correct the tire 116 uniformity, thereby improving its quality, by grinding as determined by the computer 126 which utilizes the uniformity force measurements in combination with predetermined criteria and other test data, possibly communicated by means of a connection to a factory computer network (not shown).

Generally speaking, a TUM 100, as typically used on the factory floor for production tire measurements (e.g., low speed TUM 222 in FIG. 2), is a low speed machine designed to be adequate for quickly measuring one production tire after another. Such a TUM 222 can be quickly loaded and unloaded, efficiently reaches and stabilizes at its measurement speed (typically 60 rpm), and has sensors and sensing methods with suitable sensitivities for measuring the desired tire uniformity data at its measurement speed. The factory floor TUM 222 is generally automated through the use of relay logic and/or computerized controllers that may be separate (e.g., a programmable logic controller "PLC") or combined with the TUM computer 126. In order to facilitate factory floor TUM 222 measurements at intermediate speeds (e.g., 300 rpm to 750 rpm), this invention recognizes the likely need for certain modifications to a typical low speed factory floor TUM. These modifications may include, for example: changing drive motors 118 and motor controls to enable intermediate speed operation, providing sensors (e.g., 122) with sensitivities suited to possibly new ranges of values for force variation measurements, and adding and/or modifying sensors (e.g., 122) and signal conditioning capabilities to allow measurement of tangential force variation.

Figure 2:
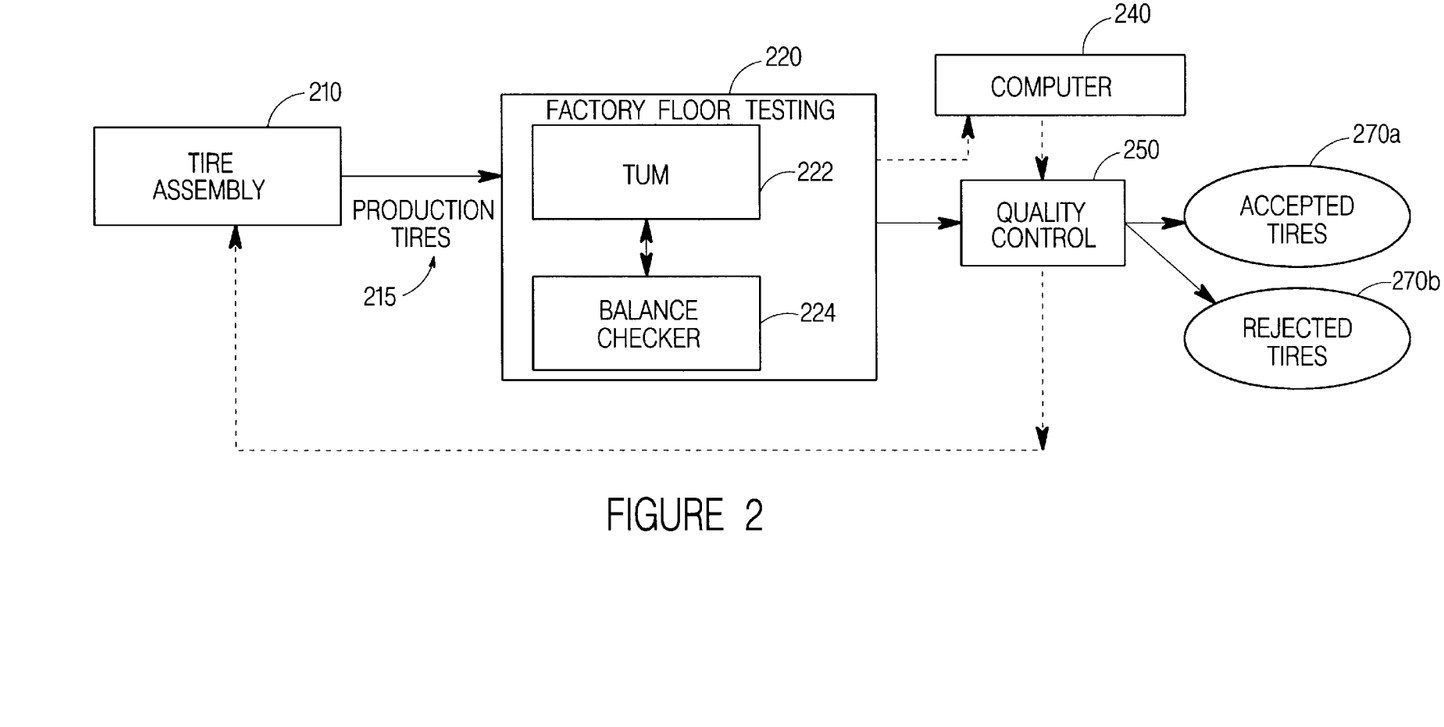
FIG. 2 is a block diagram of equipment for a method of manufacturing tires according to the present invention.

FIG. 2 illustrates an overall arrangement of equipment suitable for an implementation of the present invention. Referring to FIG. 2, the tire manufacturing process of the present invention comprises the illustrated arrangement of equipment. After tire assembly 210 (including tire building and curing), production tires 215 are subjected to factory floor testing 220 before being sorted by a quality control process 250 which separates accepted tires 270a from rejected tires 270b. The rejected tires 270b may be scrapped or re-worked as determined by standard tire production methods. In addition to sorting tires, the quality control process 250 optionally also provides feedback to the tire assembly process 210 in order to make corrections (e.g., manufacturing machine adjustments) based on the results observed by the quality control process 250. There may be more than one type of "accepted" tire 270a if, for example, there are different acceptance criteria for different customers. The quality control process 250 is preferably an automated device under control of a computer 240, which may be a networked computer. The computer 240 receives measurement data from the factory floor testing 220. The factory floor testing 220 conducts measurements (to be detailed hereinbelow) on a factory floor TUM 222 (e.g., TUM 100, possibly modified for intermediate speed use as described hereinabove), optionally in conjunction with measurements on a balance checker 224. The balance checker 224 measurements, while typically part of the normal factory floor testing 220, are optional and not necessary for implementation of the present invention. A computer (e.g., 240) receives measurement data from factory floor testing 220 for a specific production tire 215, utilizes the data to determine a tire uniformity prediction for the specific production tire 215, and then supplies the tire uniformity prediction to the quality control process 250 for determining acceptance or rejection of the specific production tire 215.

The tire uniformity prediction is a predicted value for a component of a tire uniformity force variation harmonic, for example the value (magnitude) of R1H at 1050 rpm. The present invention comprises a prediction method that utilizes curve fitting to measurements made at intermediate speeds, and then extrapolating to higher speeds using the fitted curve as a prediction equation. The intermediate speed measuring, the curve fitting and the extrapolating processes are repeated for each production tire.

At least three, and preferably four intermediate test speeds are selected as follows: A highest reasonable test speed 302b is determined for the factory floor TUMs 222, which will be used for the inventive method. The TUMs 222 may be modified as detailed hereinabove, preferably so that the highest reasonable test speed 302b is as low as possible and preferably not more than about 750 rpm. Various TUM factors known in the art, such as speed stabilization time, TUM structural rigidity and ruggedness, sensor sensitivity, etc, will determine how high a tire rotational speed is "reasonable" for use in factory floor measurements of production tires on modified low speed TUMs.

The lowest possible "reasonable" speed is desired, and it may be advantageous to create new "intermediate speed production TUMs" for use with the present invention. The lower test speed 302a (preferably greater than 60 rpm) is selected as the lowest possible "reasonable" speed because higher speed requires more modification of conventional low speed TUM machine. Also, the highest test speed 302b is preferably as low as possible as long as it will still give good correlation to the real (or laboratory) HSU measurement. For example, the lowest reasonable test speed 302a can be selected as a value at which the equipment sensitivities allow for feasible detection of force variation at low speeds. That is, the lower test speed can be about 200 rpm to about 350 rpm, but must be less than the highest reasonable test speed 302b, and preferably at least about 200 rpm below the highest reasonable test speed 302b. For the example illustrated in FIG. 3, the highest reasonable test speed 302b is determined to be 750 rpm, and the lower test speed 302a is determined to be 300 rpm, which is 450 rpm below the highest reasonable test speed 302b. Finally, the at least three intermediate test speeds are selected to be spaced at approximately regular intervals between and including the lower test speed 302a and the highest reasonable test speed 302b; thereby selecting a first test speed approximately equal to the lower test speed 302a, a last test speed approximately equal to the highest reasonable test speed 302b, and spacing the remaining one or more test speed selections at regular—preferably equal—intervals between the first test speed and the last test speed. In the example illustrated in FIG. 3, the first test speed is 300 rpm, the last test speed is 750 rpm, and two in-between test speeds are spaced at 150 rpm intervals to be selected as 450 rpm and 600 rpm. It should be noted that for the purpose of proving the present invention, the low speed measurements were taken on a laboratory HSU machine because a factory floor tire uniformity machine modified for low speed operation between about 200 rpm to 750 rpm was not yet operational.

It should be noted that the objective of the intermediate test speed selection process described above is to provide measurement data which allows the best possible curve fitting and extrapolation calculations. As is known in the mathematical and statistical arts, the number of measurement points should be maximized, should be spread over the area of interest for the curve, and should range as close as possible toward the point for which extrapolation is desired, thereby minimizing the extent of the extrapolation. These mathematical considerations must be balanced against the known practical limits of factory floor tire uniformity measurements on production tires.

Once measurements of tire uniformity are made at the selected intermediate test speeds, then the measurement data is utilized to fit a curve to the data, preferably by means of a least squares curve fitting process. The present invention comprises curve fitting of any type of curve, preferably a curve type which is experimentally determined to provide the best predictions for a given set of intermediate test speeds, a given prediction speed, a given tire construction, and a given component of tire uniformity. For the example illustrated in FIG. 3, the inventor determined that R1H is adequately predicted using a parabolic curve fit to the four data points between the lower test speed 302a, and the highest reasonable test speed 302b. A parabolic curve has the form:

$$R1H = a\omega^2 + b\omega + c \tag{1}$$

where $\omega$ (omega) is the tire rotational speed in rpm, and a, b, and c are parameters to be determined by the curve fitting process. The least squares curve fitting process is well known, and comprises calculating differences between the data points and a fitted curve, then adjusting the shape and position of the fitted curve (e.g., by adjusting the parameters a, b, c) until the sum of the squares of the differences is minimized. Optionally as a part of the curve fitting process, the well-known technique of "weighting" data points is applied to allow measurements at the higher speeds of the intermediate speeds to have a greater influence on the curve parameters than measurements at the lower speeds of the intermediate speeds. It can be experimentally determined when to advantageously use this optional weighting of data in the curve fitting process.

Once a curve has been fit (e.g., parameters a, b, and c for equation (1) have been given specific values for the tire being tested), than a prediction can be made by extrapolation to determine a high speed tire uniformity component. Extrapolation (in two dimensions) is also a well-known mathematical process wherein an equation is used to determine (in two dimensional cases such as this) a dependent variable value from an independent variable value. The equation that is used for extrapolation is determined from known data points (independent variable, dependent variable pairs). Extrapolation then consists of plugging a new independent variable value into the extrapolation equation (i.e., the prediction equation) to calculate the dependent variable value corresponding to the new independent variable value. For extrapolation, the new independent variable value is outside the range of known data point independent variable values. (Interpolation is a similar mathematical process, which differs only in that the new independent variable value is inside the range of known data point independent variable values.) For the example illustrated in FIG. 3, the prediction equation is determined by curve fitting to R1H measurements performed at speeds between 300 rpm and 750 rpm, and then the higher prediction speed of 1050 rpm is plugged into the prediction equation to calculate the predicted R1H high speed component value.

Exemplary results of the inventive prediction method are illustrated in FIGS. 3A to 3E. For the purpose of determining the accuracy of the inventive method, additional measurements outside the range of the intermediate test speeds were performed and are shown plotted in the graphs (dots indicating measurements). It may be noted that FIGS. 3A to 3E illustrate the same five tire measurement curves 310, 320, 330, 340, 350 that are illustrated in FIG. 3, but each of the tire measurement curves 310, 320, 330, 340, 350 is plotted in its own graph using an expanded vertical axis with a scale and range appropriate to the curve being plotted. Along with each of the tire measurement curves 310, 320, 330, 340, 350 (shown by solid lines) is plotted a corresponding prediction curve 312, 322, 332, 342, 352 (shown by dashed lines), which is a plot of a prediction equation determined according to the inventive method of curve fitting to intermediate speed data points, in this example to the data points at 300 rpm, 450 rpm, 600 rpm, 750 rpm. Each of the illustrated prediction curves 312, 322, 332, 342, 352 shows plotted points (indicated by '+') which were calculated by applying the prediction equation to each of the speeds shown. The calculated (extrapolated) value at the prediction speed (1050 rpm) is the prediction 313$b$, 323$b$, 333$b$, 343$b$, 353$b$, and the difference between each prediction 313$b$, 323$b$, 333$b$, 343$b$, 353$b$ and each corresponding actual measurement 311$b$, 321$b$, 331$b$, 341$b$, 351$b$ is shown as the prediction error D1, D2, D3, D4, D5. The prediction errors for the 5 tires illustrated were: D1=+0.4, D2=−0.5, D3=−0.1, D4=+0.1, D5=+0.1. For the entire set of 47 test tires (of which these five tires are a representative subset) a correlation coefficient $R^2$ was calculated and determined to be $R^2$=0.996, which is considered to indicate excellent correlation.

Figure 4:
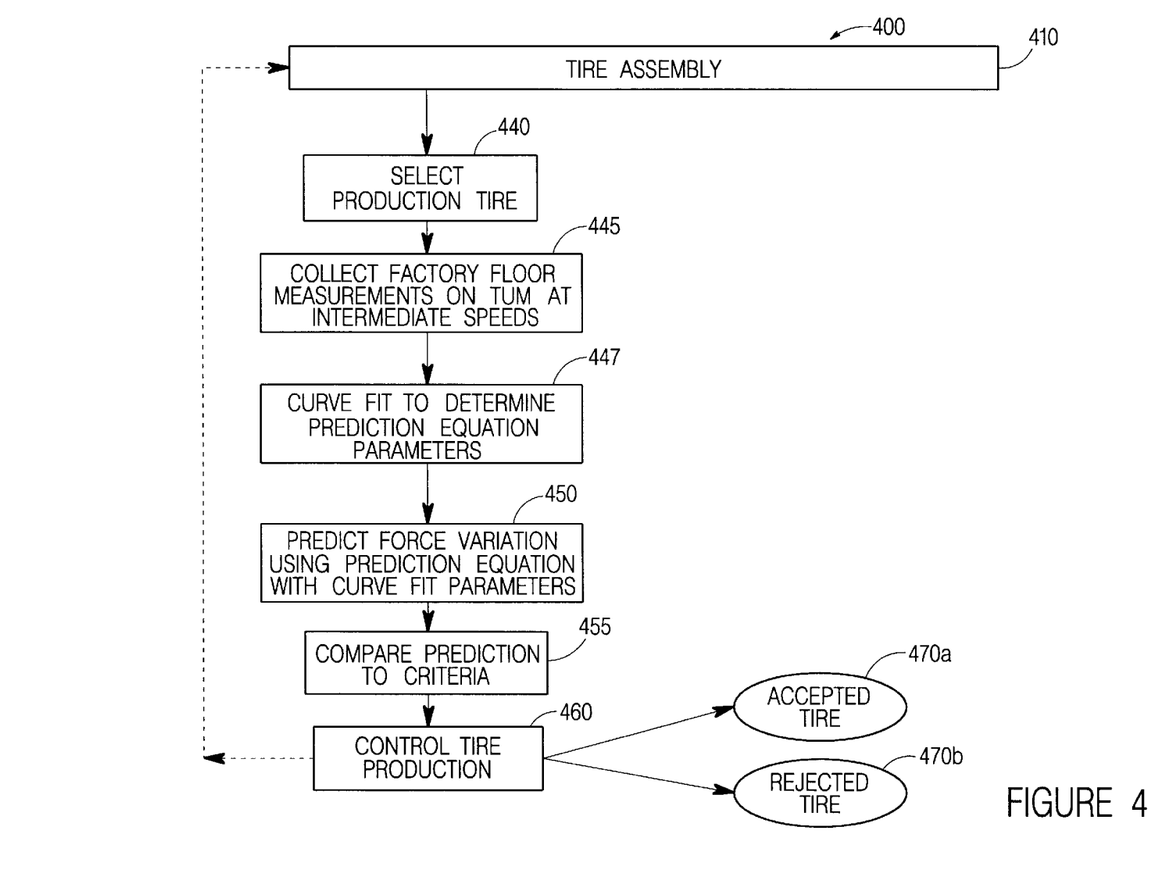
FIG. 4 is a flow diagram illustrating a tire manufacturing method according to the present invention.

FIG. 4 is a flow diagram illustrating a tire manufacturing method 400 according to an embodiment of the present invention. The tire manufacturing method 400 incorporates the inventive method for predicting a harmonic component of force variation as described hereinabove. It is preferable that, preparatory to implementing the inventive method 400 for a given tire construction, experiments will have been conducted to determine the prediction curve type which provides the best predictions for a given set of intermediate test speeds, a given prediction speed, and a given component of tire uniformity. Equipment for the tire manufacturing method 400 is illustrated in the block diagram of FIG. 2. As shown in FIG. 4, and with reference also to FIG. 2, the tire manufacturing method 400 begins (step 410) with suitable tire assembly 210 by known tire production methods. The steps 440, 445, 447, 450, 455, and 460 are routinely performed as a part of tire production according to the inventive method of manufacturing 400. In step 440 a production tire 215 is selected from tire assembly step 410 according to predetermined selection criteria such as, for example, a sampling plan or, for example, 100% testing of selected tire constructions.

In step 445, suitable measurements are performed on the selected production tire 215, and the measurement data collected, in the factory floor testing 220 using a TUM 222 which may be suitably modified for intermediate speed measurements as described hereinabove. Suitable measurements are preferably measurements of the one or more desired harmonic components of one or more force variations for which predictions are desired. The suitable measurements are conducted at intermediate speeds, preferably intermediate speeds predetermined by the experiments described hereinabove. For example, the first harmonic component of radial force variation (R1H) is measured at intermediate speeds 300 rpm, 450 rpm, 600 rpm, and 750 rpm.

In step 447, for each desired harmonic component, the measurement data collected in step 445 is used in a least squares curve fitting process to determine the values of the parameters in a predetermined prediction equation, preferably a prediction equation predetermined by the experiments described hereinabove. For example, values of parameters a, b, and c are determined for a parabolic prediction equation used for the R1H component. This curve fitting step 447 is preferably carried out in a computer (e.g., computer 240).

In step 450, each desired force variation component at a desired prediction speed (e.g., R1H at 1050 rpm) is predicted by extrapolation using the predetermined prediction equation with parameter values determined in step 447. This prediction step 450 is preferably carried out in a computer (e.g., computer 240), which makes the prediction available to quality control 250.

In step 455, the prediction (e.g., a predicted value of R1H at 1050 rpm) is compared to predetermined quality criteria (e.g., a maximum acceptable value for R1H at 1050 rpm), resulting in quality control decisions which are carried out by quality control 250 in step 460.

In step 460, generally controlled by known quality control algorithms in a networked factory computer (e.g., computer 240), a quality control device and/or computer (e.g., quality control device 250) controls tire production by means including accepting or rejecting the production tire 215, thereby producing an accepted tire 470$a$ (compare 270$a$) or a rejected tire 470$b$ (compare 270$b$). In step 460, the quality control process 250 optionally also provides feedback to the tire assembly process 210 (step 410) in order to make corrections (e.g., manufacturing machine adjustments) based on the results of comparing the prediction to predetermined quality criteria in step 455.

It can be seen that the methods of the present invention provide several advantages over prior art methods such as determining and using transfer function equations for prediction. The inventive methods are simpler, and do not require testing sample sets of tires on high speed laboratory equipment. The inventive method also provides a specific prediction equation for each production tire, based on the unique characteristics of each production tire, rather than assuming common characteristics among all tires of a given construction. The inventive method does not require advanced testing of a sample set of tires from each tire construction, and does not require different predetermined prediction equations for each factory floor TUM.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for predicting a harmonic component of force variation for a production tire comprising the steps of:
    collecting a set of measurement data for the production tire, the measurement data comprising measurements of the harmonic component of force variation at a plurality of intermediate test speeds on a factory floor tire uniformity machine;
    determining parameter values for a prediction equation by performing a curve fit of a predetermined curve type to the set of measurement data; and
    predicting a harmonic component of force variation for the production tire rotating at a prediction speed by applying the prediction speed to the prediction equation.

2. A method according to claim 1, characterized by the step of:

predetermining an optimum quantity and individual values of the plurality of intermediate test speeds.

3. A method according to claim 2, characterized in that:

the steps of predetermining the curve type and the optimum quantity and individual values of the plurality of intermediate test speeds are accomplished by experimentation.

4. A method according to claim 2, characterized in that:

the steps of predetermining the curve type and the optimum quantity and individual values of the plurality of intermediate test speeds are performed for each tire construction, for each harmonic component to be predicted, and for each prediction speed.

5. A method according to claim 2, characterized in that:

the curve type is predetermined to be a parabolic curve type, and the quantity of the plurality of intermediate test speeds is predetermined to be at least three.

6. A method according to claim 2, further characterized by the steps of:

predetermining a highest reasonable test speed and a lower test speed, which is less than the highest reasonable test speed; and spacing the individual values of the plurality of intermediate test speeds at approximately regular intervals between and including the lower test speed and the highest reasonable test speed.

7. A method according to claim 6, characterized by the step of:

predetermining the lower test speed to be greater than 60 rpm.

8. A method according to claim 6, characterized by the step of:

predetermining the lower test speed to be at least 200 rpm.

9. A method according to claim 6, characterized by the step of:

predetermining the lower test speed to be greater than 60 rpm, and at least 200 rpm below the highest reasonable test speed.

10. A method according to claim 6, characterized by the step of:

predetermining the lower test speed to be approximately 300 rpm; and predetermining the highest reasonable test speed to be approximately 750 rpm.

11. A method according to claim 1, characterized by the step of:

performing the curve fit by means of a least squares curve fitting process.

12. A method according to claim 1, characterized in that:

the step of performing the curve fit comprises weighting higher speed measurement data points more than lower speed measurement data points.

13. A method of manufacturing tires comprising the steps of:

collecting a set of measurement data for a production tire, the measurement data comprising measurements of a harmonic component of force variation at a plurality of intermediate test speeds on a factory floor tire uniformity machine;

determining parameter values for a prediction equation by performing a curve fit of a predetermined curve type to the set of measurement data;

predicting a harmonic component of force variation for the production tire rotating at a prediction speed by applying the prediction speed to the prediction equation;

comparing the predicted harmonic component of force variation for the production tire to predetermined criteria; and controlling the manufacturing of production tires in response to results of the step of comparing.

14. A method according to claim 13, characterized by the step of:

predetermining an optimum quantity and individual values of the plurality of intermediate test speeds.

15. A method according to claim 14, characterized in that:

the steps of predetermining the curve type and the optimum quantity and individual values of the plurality of intermediate test speeds are performed for each tire construction, for each harmonic component to be predicted, and for each prediction speed.

16. A method according to claim 14, characterized in that:

the curve type is predetermined to be a parabolic curve type, and the quantity of the plurality of intermediate test speeds is predetermined to be at least three.

17. A method according to claim 14, further characterized by the steps of:

predetermining a highest reasonable test speed and a lower test speed which is less than the highest reasonable test speed; and spacing the individual values of the plurality of intermediate test speeds at approximately regular intervals between and including the lower test speed and the highest reasonable test speed.

18. Apparatus for controlling tire manufacturing, comprising:

factory floor testing equipment comprising an intermediate speed production tire uniformity machine for measuring production tires after a tire assembly process;

a computer for collecting measurement data from the factory floor testing equipment, for curve fitting to determine prediction equation parameters, and for predicting a harmonic component of force variation; and a quality control means for accepting and rejecting production tires based on a harmonic component of force variation predicted for the production tires.

19. Apparatus according to claim 18, characterized in that:

the quality control means provides feedback for correcting the tire assembly process.

20. Apparatus according to claim 18, characterized in that:

the intermediate speed production tire uniformity machine is a low speed factory floor TUM which has been modified for optimum performance when measuring each production tire at a plurality of intermediate speeds.

* * * * *